(12) United States Patent
Partyka et al.

(10) Patent No.: US 11,891,107 B2
(45) Date of Patent: Feb. 6, 2024

(54) COMPACT HEAT RESISTANT FLEX COUPLING ASSEMBLY WITH RESTRICTIVE BENDING

(71) Applicant: Steering Solutions IP Holding Corporation, Saginaw, MI (US)

(72) Inventors: Michael E. Partyka, Saginaw, MI (US); Sergio R. Molinar, Freeland, MI (US); William J. Knight, Bay City, MI (US); Terry E. Burkhard, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 173 days.

(21) Appl. No.: 17/008,554

(22) Filed: Aug. 31, 2020

(65) Prior Publication Data
US 2022/0063701 A1 Mar. 3, 2022

(51) Int. Cl.
| | |
|---|---|
| *B62D 1/16* | (2006.01) |
| *B62D 1/19* | (2006.01) |
| *B62D 1/20* | (2006.01) |
| *F16D 3/78* | (2006.01) |
| *F16D 3/50* | (2006.01) |
| *F16D 3/58* | (2006.01) |

(52) U.S. Cl.
CPC .............. *B62D 1/163* (2013.01); *B62D 1/19* (2013.01); *B62D 1/20* (2013.01); *F16D 3/50* (2013.01); *F16D 3/58* (2013.01); *F16D 3/78* (2013.01)

(58) Field of Classification Search
CPC .. B62D 1/163; B62D 1/19; B62D 1/20; F16D 3/50; F16D 3/58; F16D 3/78
USPC .......................................................... 464/93
See application file for complete search history.

(56) References Cited

U.S. PATENT DOCUMENTS 4,389,204 A * 6/1983 Walter ...................... F16D 3/58
464/95

* cited by examiner

*Primary Examiner* — Greg Binda
(74) *Attorney, Agent, or Firm* — Dickinson Wright PLLC

(57) ABSTRACT

A flex coupling assembly for coupling a first shaft to a second shaft of a shaft assembly. The flex coupling assembly decouples axial and torsional stiffness from bending stiffness of the shaft assembly, thereby dampening the transmission of noise and vibration between the first and second shafts. The flex coupling assembly includes an inner housing subassembly and an outer housing subassembly. The inner housing subassembly includes an inner housing and a resilient flex coupling disposed in an outer housing cavity of an outer housing of the outer housing subassembly. A retention member is fixed to an outer housing to retain the inner housing subassembly in the outer housing cavity. The inner and outer housing subassemblies can rotate and translate relative to a common axis, while the inner and the outer housings restrict bending between the inner and outer housing subassemblies, thereby restricting bending between the first and second shafts.

20 Claims, 7 Drawing Sheets

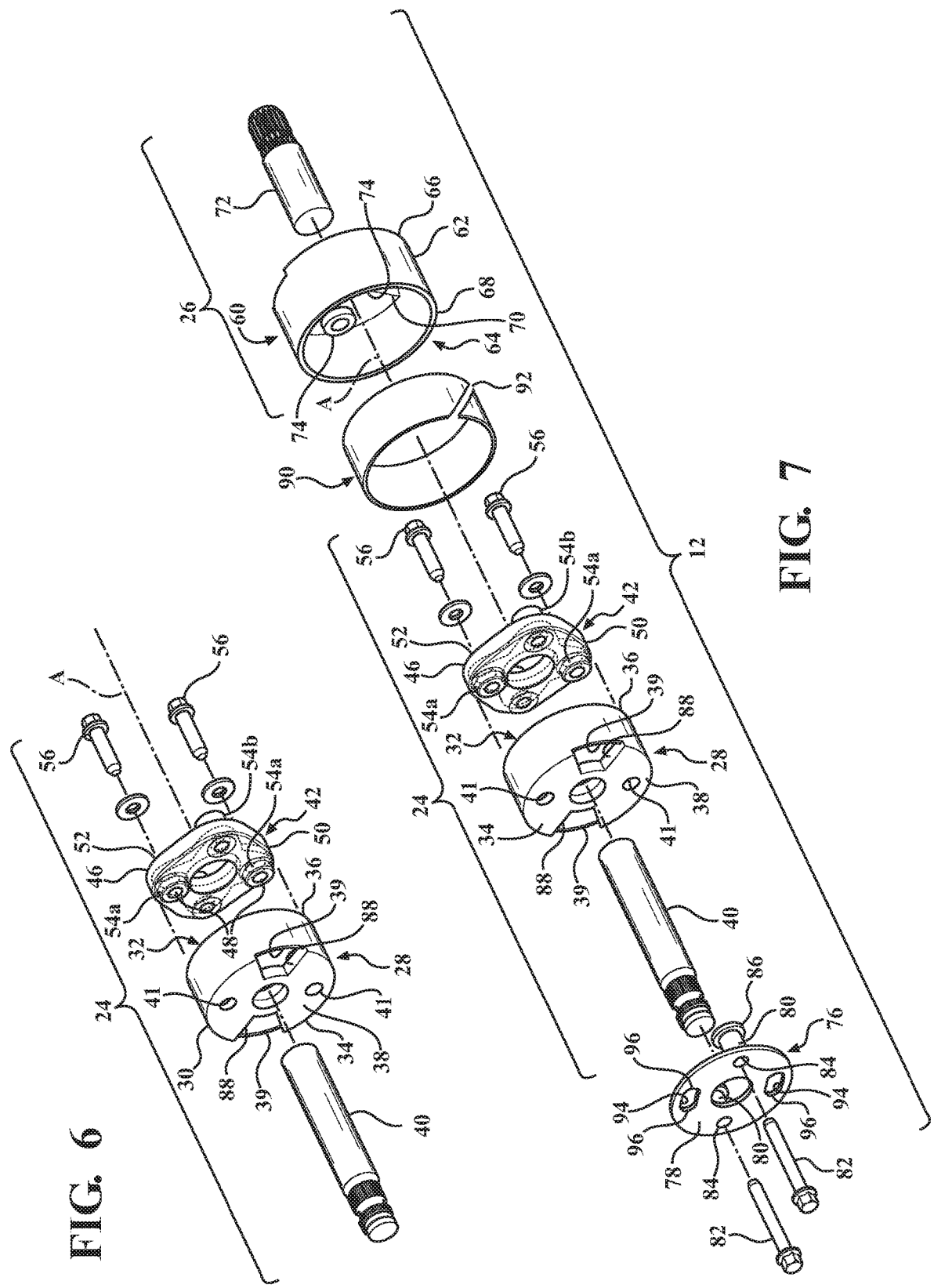

COMPACT HEAT RESISTANT FLEX COUPLING ASSEMBLY WITH RESTRICTIVE BENDING

FIELD OF THE INVENTION

The present disclosure generally relates to shaft assemblies for motor vehicles, and more specifically, to flex coupling assemblies for joining shafts of a shaft assembly together.

BACKGROUND OF THE INVENTION

Automotive shaft assembly applications, such as steering shaft applications, commonly join shafts of a shaft assembly to one another with a dampening coupler. The dampening coupler is provided between the shafts of the steering shaft to dampen noise and vibration to isolate a driver from unwanted noise and vibrations coming from the engine bay and road. Although known dampening couplers can prove effective in reducing the amount of noise and vibration that reaches the driver, they typically reduce the bending stiffness of the shaft assembly. Increased bending stiffness requirements for shaft assemblies are being required by manufacturers, thereby causing the overall effectiveness of the dampening coupler to be compromised in its ability to dampen noise and vibration in order to meet the bending stiffness requirements. Accordingly, the noise and vibration dampening characteristics of flex couplers is being sacrificed in order to meet the bending stiffness requirements. Accordingly, what is needed is a dampening coupler that meets or exceeds both the increased demands for bending stiffness, while at the same time providing the level of noise and vibration dampening desired to prevent noise and vibration from reaching the driver.

SUMMARY OF THE INVENTION

It is an object of the present disclosure to provide a flex coupling assembly for coupling a first shaft of a shaft assembly to a second shaft of the shaft assembly that overcomes at least some of the drawbacks discussed above with known dampening couplers.

It is a further object of the present disclosure to provide a flex coupling assembly that is robust and durable in use, and economical in manufacture and assembly.

It is a further object of the present disclosure to provide a flex coupling assembly that decouples axial and torsional stiffness from bending stiffness, thereby allowing more freedom in design to tune the performance of the decoupling between first and second shafts.

It is a further object of the present disclosure to provide a flex coupling assembly that provides an ability to adjust the bending stiffness of the flex coupling assembly without affecting the torsional stiffness and the axial stiffness and noise and vibration dampening performance of the flex coupling assembly.

According to the objects and advantages, an aspect of the present disclosure provides a flex coupling assembly for coupling a first shaft of a shaft assembly to a second shaft of the shaft assembly. The flex coupling assembly comprises an inner housing having a generally cylindrical inner housing wall extending along an axis and bounding an inner housing cavity between an inner housing first end and an inner housing second end. The inner housing first end has an inner housing end face extending generally transversely to the axis and the inner housing second end is open. A first shaft is fixed to the inner housing end face and extends along the axis. The flex coupling assembly further comprises an outer housing having a generally cylindrical outer housing wall extending along the axis. The outer housing wall bounds an outer housing cavity between an outer housing first end and an outer housing second end. The outer housing first end has an outer housing end face extending generally transversely to the axis and the outer housing second end is open. A second shaft is fixed to the outer housing end face and extends along the axis. A resilient flex coupling is fixed to the inner housing in the inner housing cavity and a retention member is fixed to the outer housing by at least one retention fastener member to retain the inner housing in the outer housing cavity. The inner housing and the outer housing are moveable relative to one another axially along the axis and rotatably about the axis via flexing of the resilient flex coupling to dampen the transmission of noise and vibration between the first shaft and second shaft.

In accordance with another aspect of the disclosure, the inner housing end face has at least one through opening, with the at least one retention fastener member extending through the at least one through opening in clearance relation therewith, wherein the at least one through opening acts as a positive stop to limit the degree of relative rotation between the inner housing and the outer housing.

In accordance with another aspect of the disclosure, the retention member has at least one protrusion extending through the at least one through opening in clearance relation therewith into engagement with the resilient flex coupling, with the at least one retention fastener member extending through the at least one protrusion.

In accordance with another aspect of the disclosure, the at least one retention fastener member includes a plurality of retention fastener members, wherein the at least one through opening includes a plurality of through openings and the at least one protrusion includes a plurality of protrusions, wherein the plurality of retention fastener members extend through the plurality of protrusions and the plurality of protrusions extend through the plurality of through openings in clearance relation therewith.

In accordance with another aspect of the disclosure, the resilient flex coupling is fixed to the inner housing by at least one coupling fastener member, with the retention member having at least one slot, wherein the at least one coupling fastener member extends into the at least one slot in clearance relation therewith.

In accordance with another aspect of the disclosure, wherein the inner housing end face has at least one through opening and the at least one retention fastener member extends through the at least one through opening in clearance relation therewith, wherein at least one of the at least one slot and the at least one through opening acts as a positive stop to limit the degree of relative rotation between the inner housing and the outer housing.

In accordance with another aspect of the disclosure, the retention member has at least one protrusion extending through the at least one through opening in clearance relation therewith into engagement with the resilient flex coupling, wherein the at least one retention fastener member extends through the at least one protrusion.

In accordance with another aspect of the disclosure, the generally cylindrical inner housing wall and the generally cylindrical outer housing wall are spaced radially from one another by an annular gap and further including an annular band disposed in the annular gap to increase the bending rigidity between the first shaft and the second shaft and to facilitate relative axial and rotational movement therebetween.

In accordance with another aspect of the disclosure, the annular band can be provided being circumferentially discontinuous to facilitate assembly and the formation of a spring biased press and/or interference fit between the annular band and one of the generally cylindrical inner housing wall and the generally cylindrical outer housing wall.

In accordance with another aspect of the disclosure, the annular band can be fixed to one of the generally cylindrical inner housing wall and the generally cylindrical outer housing wall.

In accordance with another aspect of the disclosure, the resilient flex coupling can be provided having a metal core overmolded with an elastomeric body.

In accordance with another aspect of the disclosure, a flex coupling assembly for coupling a first shaft of a shaft assembly to a second shaft of the shaft assembly comprises an inner housing subassembly and an outer housing subassembly. The inner housing subassembly comprises an inner housing having a generally cylindrical inner housing wall extending along an axis and bounding an inner housing cavity between an inner housing first end and an inner housing second end. The inner housing first end has an inner housing end face extending generally transversely to the axis and has at least one through opening. The inner housing second end is open. The inner housing subassembly further comprises a first shaft fixed to the inner housing end face, with the first shaft extending along the axis, and a resilient flex coupling fixed to the inner housing in the inner housing cavity. The outer housing subassembly comprises an outer housing having a generally cylindrical outer housing wall extending along the axis and bounding an outer housing cavity between an outer housing first end and an outer housing second end. The outer housing first end has an outer housing end face extending generally transversely to the axis and the outer housing second end is open. The outer housing subassembly further comprises a second shaft fixed to the outer housing end face, with the second shaft extending along the axis. The inner housing subassembly is disposed in the outer housing cavity. A retention member is fixed to the outer housing by at least one retention fastener member. The at least one retention fastener member extends through the at least one through opening in the inner housing end face in clearance relation therewith and retains the inner housing subassembly in the outer housing cavity.

In accordance with another aspect of the disclosure, the inner housing and the outer housing are moveable relative to one another axially along the axis and rotatably about the axis via flexing of the resilient flex coupling, thereby providing dampening to the transmission of noise and vibration between the first shaft and the second shaft. The inner housing and the outer housing are inhibited from moving out of co-axial alignment with one another due to a radially aligned, nested relationship between the respective generally cylindrical inner housing wall and the generally cylindrical outer housing wall, thereby enhancing the bending stiffness of the flex coupling assembly.

In accordance with another aspect of the disclosure, a bending force tending to bend said first shaft relative to said second shaft is counteracted by an equal and opposite force applied between the generally cylindrical inner housing wall and the generally cylindrical outer housing wall, such that the bending stiffness of the flex coupling assembly is enhanced.

These and other objects, advantages and features will become readily apparent to one possessing ordinary skill in the art in view of the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 6 is an exploded view of an inner housing and shaft assembly of the flex coupling assembly of FIG. 1;

FIG. 7 is an exploded view of the flex coupling assembly of FIG. 3; and

DETAILED DESCRIPTION

Figure 1:
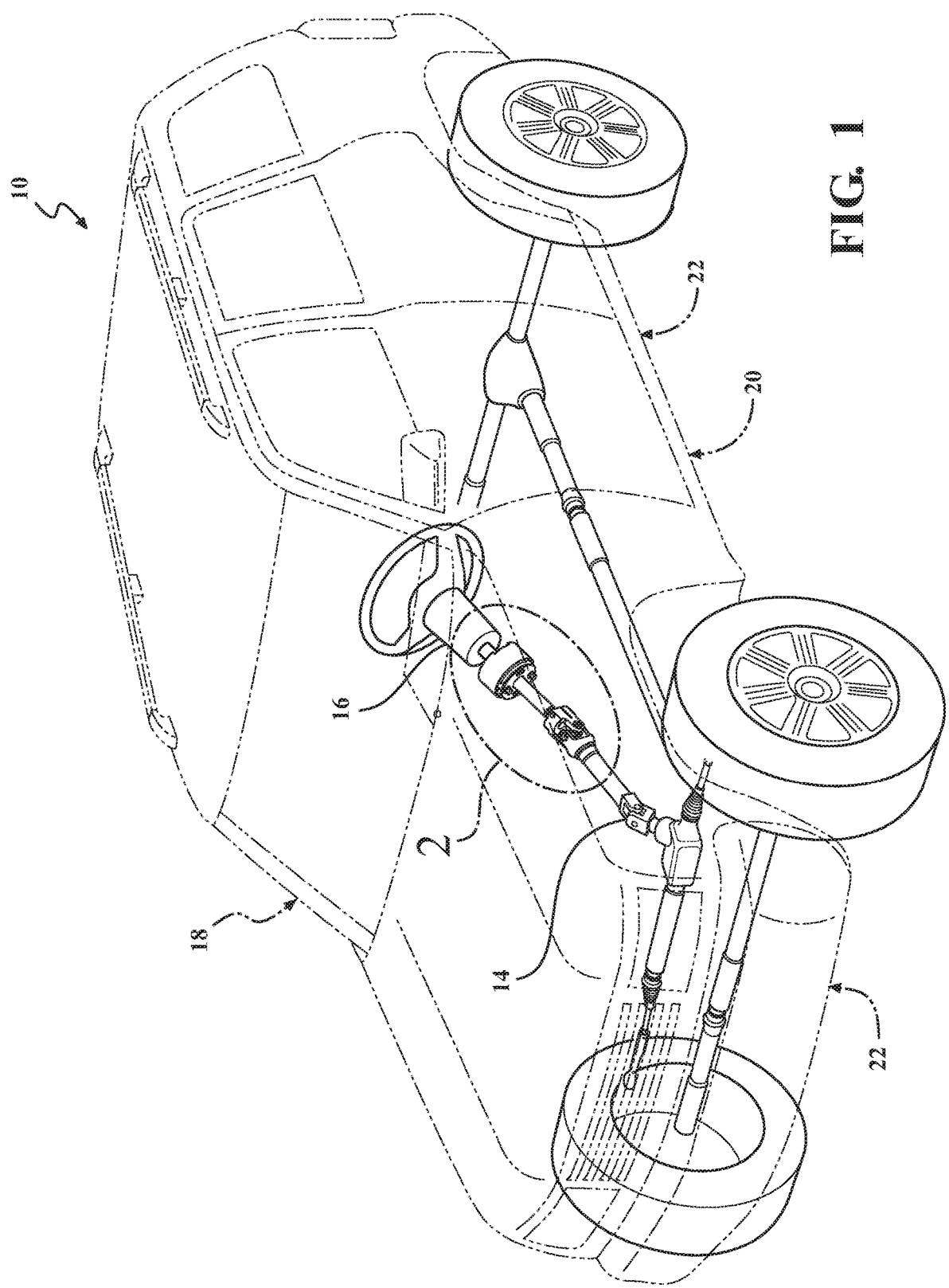
FIG. 1 is a perspective view of a motor vehicle having a steering system including a flex coupling assembly constructed in accordance with one aspect of the invention.
Figure 2:
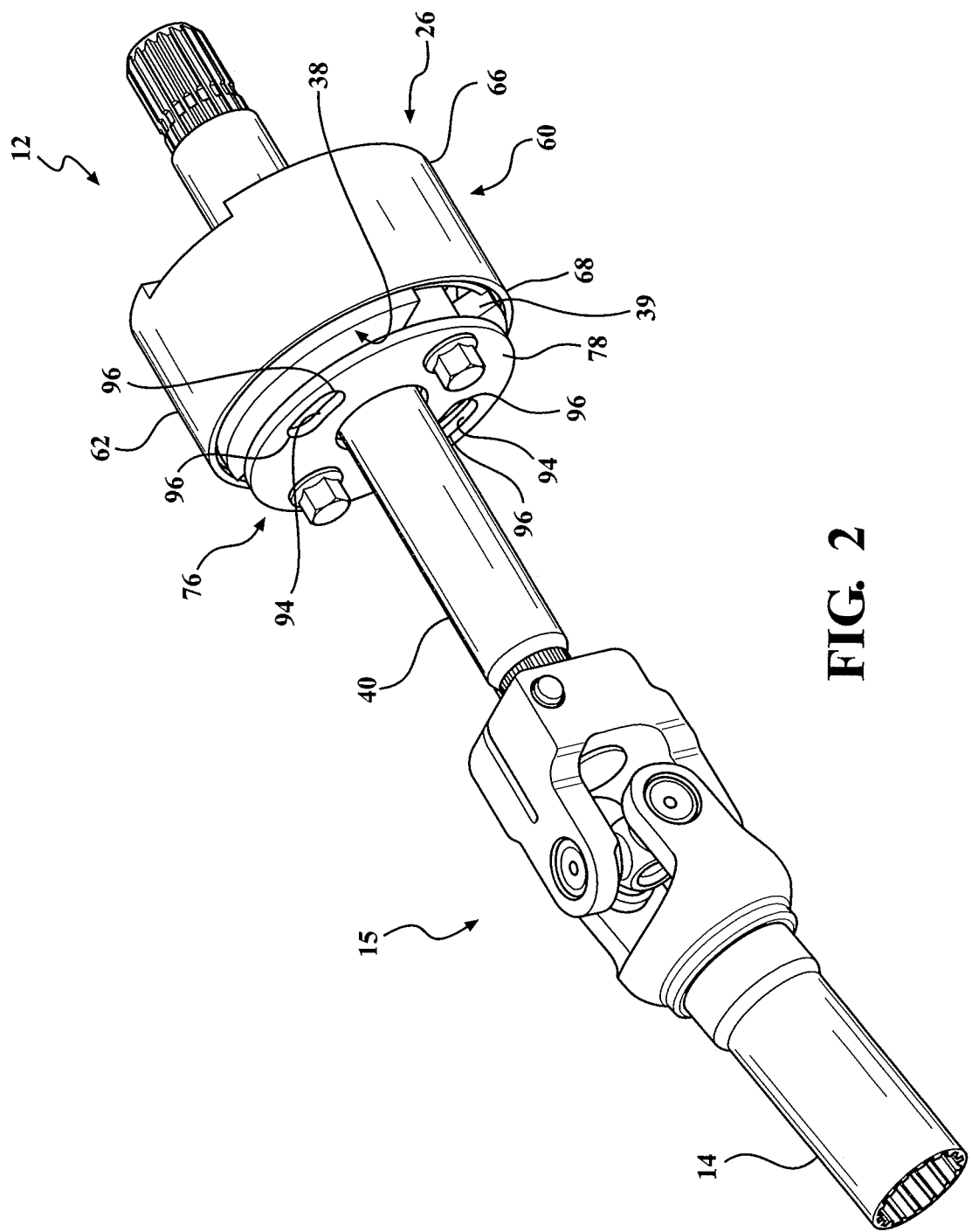
FIG. 2 is a perspective view of the flex coupling assembly of FIG. 1 shown coupled to a lower cardan joint assembly of the steering system.
Figure 3:
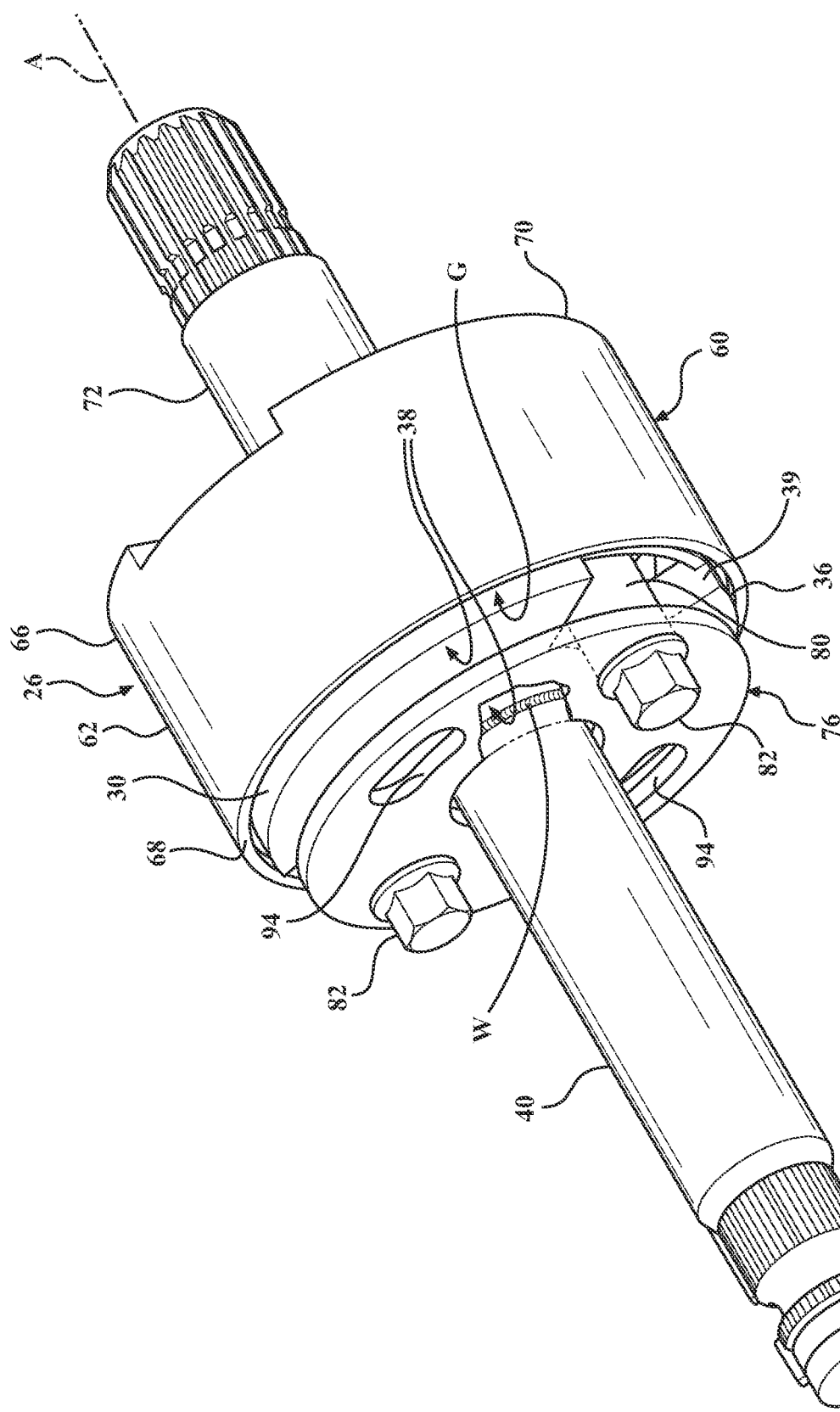
FIG. 3 is a view similar to FIG. 2 of the flex coupling assembly with the cardan joint assembly removed from the flex coupling assembly.
Figure 4:
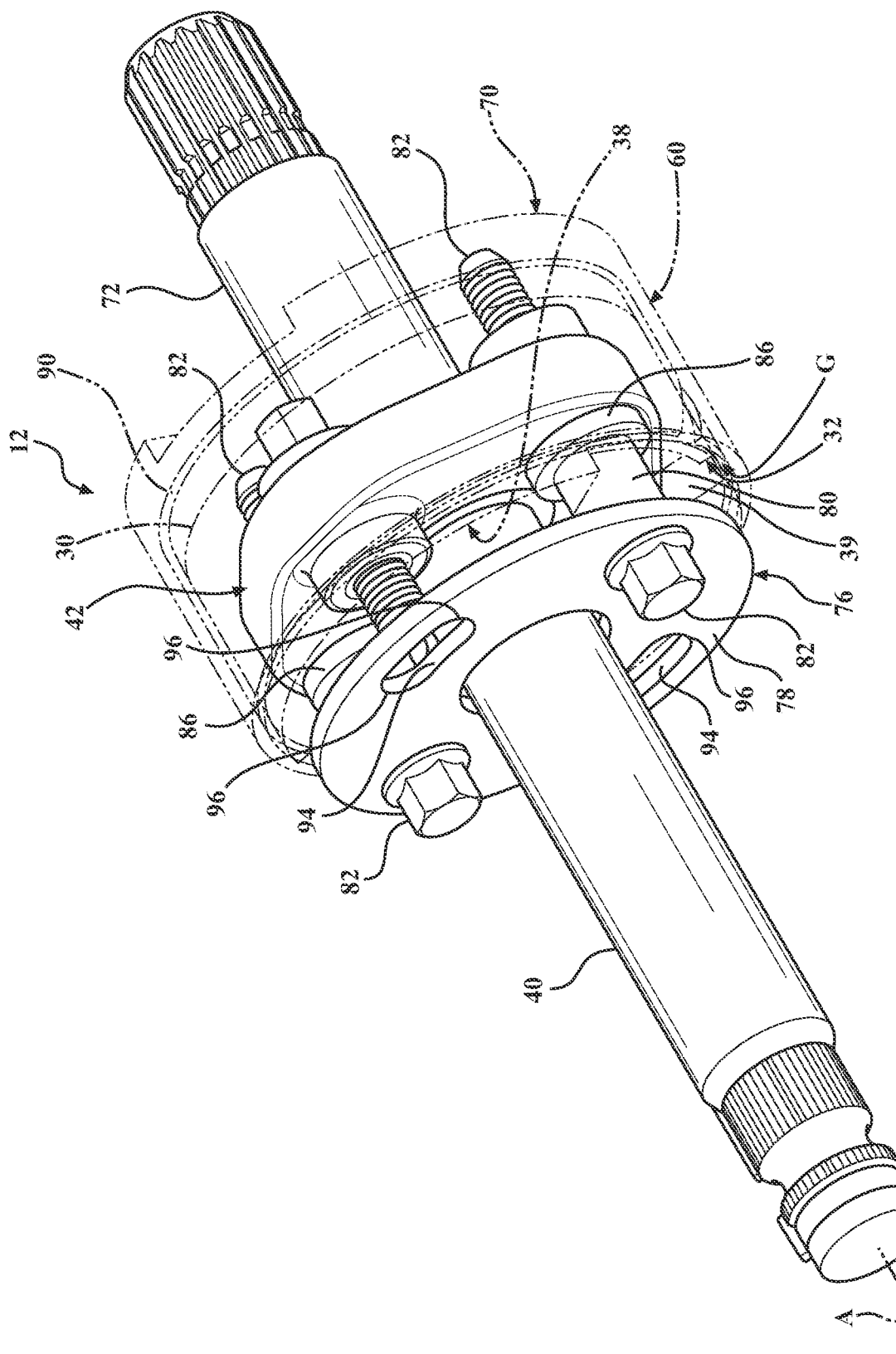
FIG. 4 is a view similar to FIG. 3 with housings of the flex coupling assembly shown in transparency for clarity of internal components.
Figure 5:
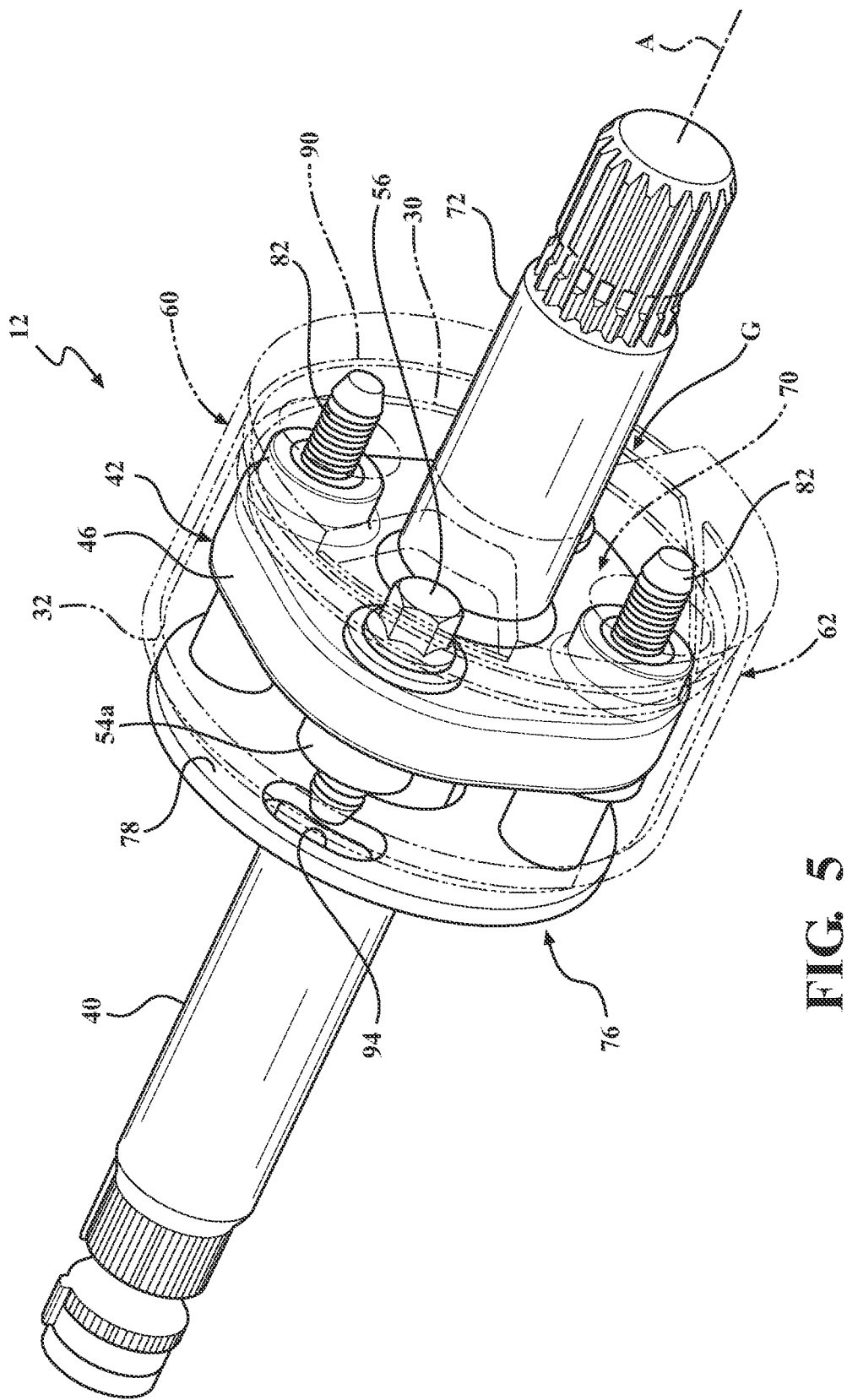
FIG. 5 is a perspective view of the flex coupling assembly of FIG. 1 looking from an opposite end as shown in FIG. 4, with the housings of the flex coupling assembly shown in transparency for clarity of internal components.

Referring now to the Figures, where the invention will be described with reference to specific embodiments, without limitation, FIG. 1 illustrates a motor vehicle 10 having a flex coupling assembly 12 (identified in FIGS. 2, 4, 5 and 7) arranged in accordance with one aspect of the disclosure for coupling a first shaft 14 of a shaft assembly 15 to a second shaft 16 of the shaft assembly 15. In the non-limiting, exemplary embodiment illustrated, the flex coupling assembly 12 is integrated into a steering system 18 of the motor vehicle 10, although it is contemplated herein that the flex coupling assembly 12 could be integrated into other shaft assemblies, including a drive shaft assembly 20, axle assembly 22, or otherwise. The flex coupling assembly 12, as discussed further hereafter, provides an ability to regulate the bending stiffness of the shaft assembly 15 without affecting the torsional stiffness, axial stiffness and dampening performance of the flex coupling assembly 12. Thus, it is to be recognized that the bending stiffness across the flex coupling assembly 12 is isolated and decoupled from the axial and torsional stiffness of the flex coupling assembly 12, thereby providing an ability to adjust the bending stiffness, as desired, without affecting the torsional stiffness of the flex coupling assembly 12, and vice versa. It is further to be understood that any one of the aforementioned stiffnesses can be selectively adjusted without affecting the remaining stiffnesses.

The flex coupling assembly 12 has an inner housing subassembly 24 (FIG. 6) and an outer housing subassembly 26 (FIG. 7). The inner housing subassembly 24 includes an inner housing 28 having a generally cylindrical inner housing wall 30 extending along an axis A. The inner housing wall 30 bounds an inner housing cavity 32 that extends between an inner housing first end 34 and an inner housing second end 36. The inner housing first end 34 has an inner housing end wall, also referred to as end face 38, extending along a plane generally transversely to the axis A. The inner housing end face 38 has at least one, and shown as a plurality, and more particularly a pair of diametrically opposite through openings 39 shown being diametrically opposite one another, by way of example and without limitation. The inner housing end face 38 further at least one, and shown as a plurality, and more particularly a pair of diametrically opposite fastener openings, such as threaded fastener openings 41, shown being diametrically opposite one another, by way of example and without limitation. The threaded fastener openings 41 and the through openings 39 are arranged in circumferentially offset relation with one another, shown as being offset by about 90 degrees with one another. The inner housing second end 36 is open, shown as having the generally cylindrical inner housing wall 30 terminating a circular free edge. The inner housing subassembly 24 further includes an inner housing first shaft 40 fixed to the inner housing end face 38, such as via a weld joint W, by way of example and without limitation, with the first shaft 40 extending coaxially along the axis A away from the inner housing cavity 32, and a resilient flex coupling 42 (FIG. 8) coupled in fixed relation to the inner housing 28 in the inner housing cavity 32.

Figure 8:
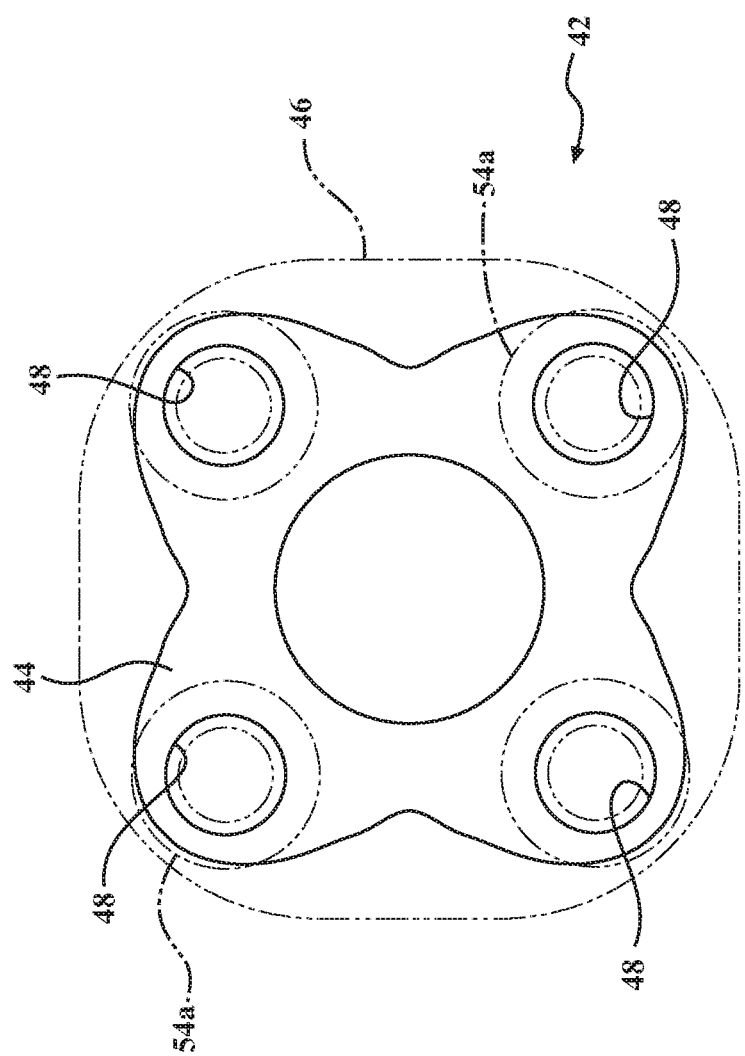
FIG. 8 is a plan view of a flex coupling of the flex coupling assembly shown in transparency for clarity purposes of internal components.

The resilient flex coupling 42, as shown in FIG. 8, has a resilient, relatively rigid core 44, overmolded with an elastomeric body 46. The core 44 can be formed from a metal material, such as a metal plate or wound wire, by way of example and without limitation. The elastomeric body 46 can be formed of rubber or some other polymeric material. The resilient flex coupling 42 has at least one, and shown as a plurality of fastener openings 48 extending through opposite sides 50, 52. One of the sides, referred to hereafter as first side 50, has a pair of protrusions, also referred to as first bosses 54a, extending axially outwardly therefrom. The first bosses 54a are arranged diametrically opposite one another. The other of the sides, referred to hereafter as second side 52, has a pair of protrusions, also referred to as second bosses 54b, extending axially outwardly therefrom. The second bosses 54b are arranged diametrically opposite one another. The first bosses 54a and the second bosses 54b are arranged in circumferentially offset relation with one another, shown as being offset by about 90 degrees with one another. The offset, out-of-phase relation facilitates axial flexing of the resilient flex coupling, as desired to reduce the transmission of noise and vibration between the first and second shafts 14, 16. The resilient flex coupling 42 is fixed to the inner housing 28 in the inner housing cavity 32 via a plurality of coupling fasteners 56, shown as a pair of threaded fasteners 56 extending through a pair of the fastener openings 48 in the flex coupling 42 into threaded engagement with the threaded fastener openings 41 in the inner housing end face 38. Upon being fixed to the inner housing 28, the bosses 54a are brought into engagement with an inner surface of the inner housing end face 38 and first side 50 is spaced axially from the inner surface of the inner housing end face 38 by an axial height of the bosses 54a. As a result of being contained in the cavity 32 of the inner housing 28, the resilient flex coupling 42 is inherently shielded from external heat, such as may be generated within an engine compartment of the motor vehicle 10.

The outer housing subassembly 26 includes an outer housing 60 having a generally cylindrical outer housing wall 62 extending along the axis A. The outer housing wall 62 bounds an outer housing cavity 64 that extends between an outer housing first end 66 and an outer housing second end 68. The outer housing first end 66 has an outer housing end face 70 that extends along a plane generally transversely to the axis A. The outer housing second end 68 is open, shown as having the generally cylindrical outer housing wall 62 terminating a circular free edge. The outer housing subassembly 26 further includes a second shaft 72 fixed to the outer housing end face 70, such as via a weld joint, by way of example and without limitation, with the second shaft 72 extending coaxially along the axis A. The outer housing 60 further includes a plurality of fastener openings, shown as a pair of threaded fastener openings 74, by way of example and without limitation, arranged diametrically opposite one another.

The inner housing subassembly 24 is disposed in the outer housing cavity 64 and fixed therein. To facilitate maintaining the inner housing subassembly 24 in fixed relation with the cavity 64 of the outer housing 60, a retention member 76 is fixed to the outer housing 60, with the inner housing subassembly 24 being captured in sandwiched relation between the outer housing end face 70 and the retention member 76. The retention member 76 has a generally planar, generally disc-shaped end wall 78 extending along a plane in generally transverse relation to the axis A and at least one protrusion, and shown a plurality of protrusions, and more particularly as a pair of protrusions 80 extending axially outwardly from the end wall 78. The pair of protrusions 80 are shown as being diametrically opposite one another and arranged for clearance receipt through the through openings 39 extending through the end face 38 of inner housing 28. At least one, and shown as a pair of retention fastener member 82 extends through a through passage 84 in the protrusions 80 and through at least one through opening 39 in the inner housing end face 38, in clearance relation therewith, through the second bosses 54b and into threaded receipt within the fastener openings 74 in the outer housing 60 to retain the inner housing subassembly 24 in the outer housing cavity 64. The protrusions 80 are shown as having enlarged, annular end flanges 86 arranged to engage the first side 50 of the flex coupling 42 as the retention fastener members 82 are tightened within the fastener openings 74, thereby pressing against the first side 50 of the flex coupling 42 and biasing the second bosses 54b into engagement with an inner surface of the outer housing end face 70. As a result of being shielded by the inner housing first end 34 and the outer housing end face 70, as well as by the walls 30, 62 of the inner and outer housings 28, 60, the resilient flex coupling 42 is completely shielded from external heat, thereby protecting the elastomeric body 46 against thermal effects.

Each of the protrusions 80 of the retention member 76 extend through separate ones of the through openings 39 in clearance relation therewith. The clearance between the protrusions 80 and a radially extending periphery 88 of the through openings 39 can be provided as desired, wherein the peripheries 88 of the through openings 39 acts as a positive stops to limit the degree of relative rotation between the inner housing 28 and the outer housing 60. As such, the inner housing 28 and the outer housing 60 are permitted to move circumferentially in torsion relative to one another a predetermined number of degrees, as determined by the clearance between each of the peripheries 88 and an outer surface of the protrusions 80, thereby providing a torsional dampening between the first and second shafts 40, 72, wherein the dampening is facilitated by the torsional rigidity provided by the resilient flex coupling 42. Upon the protrusions 80 engaging the peripheries 88, the first and second shafts 40, 72 become locked in conjoint rotation with one another. Of course, it is to be recognized that upon the torque between the first and second shafts 40, 72 being reduced, the resiliency of the resilient flex coupling 42 imparts a bias between the inner and outer housings 28, 60 causing the protrusions 80 to re-center themselves between the peripheries 88 of the through openings 39.

In addition to the torsional stop provided between the protrusions 80 and the peripheries 88, the retention member 76 can be provided having at least one slot 94 configured for receipt of a separate one of the coupling fastener members 56 extending in clearance relation therewith. As such, a pair of slots 94 are provided diametrically opposite one another for receipt of the threaded fasteners 56 therein. Upon a suitable torsional force causing inner and outer housings 28, 60 to rotate relative to another via flexing of the resilient flex coupling 42, the fasteners 56 can be brought into engagement with ends 96 of the slots 94, thereby interfering with the ability of the inner and outer housings 28, 60 to rotate relative to one another further. Accordingly, the slots 94 can also act as positive stop surfaces. It is to be recognized that the degree of desired relative rotation can be controlled by regulating at least one of the clearance between the slots 94 and the fasteners 56, as well as by regulating the clearance between each of the peripheries 88 and an outer surface of the protrusions 80.

As mentioned above, the inner housing 28, with inner housing first shaft 40 fixed thereto, and the outer housing 60, with outer housing second shaft 72 fixed thereto, are able to move axially relative to another via axial flexing of the resilient flex coupling 42. The axial clearance between the first side 50, opposite the second bosses 54*b*, and the inner surface of the inner housing end face 38, and between the second side 52, opposite the first bosses 54*a*, and the inner surface of the outer housing end face 70 can be provided as desired, wherein the respective axial clearances permit the inner housing 28 and the outer housing 60 to move axially relative to one another under an axial load applied to at least one of the first and second shafts 40, 72 along axis A. As such, axial dampening is provided between the first and second shafts 40, 72, wherein the dampening is facilitated and controlled by the axial flex rigidity provided by the resilient flex coupling 42. Upon the respective first and second sides 50, 52 flexing into engagement with the respective inner housing end face 38 and the outer housing end face 70, the first and second shafts 40, 72 become substantially fixed against axial movement relative to another. Of course, it is to be recognized that upon the axial force between the first and second shafts 40, 72 being reduced, the resiliency of the resilient flex coupling 42 imparts an axial bias between the inner and outer housings 28, 60 causing the inner and outer housings 28, 60 to return to their relaxed axial positions.

The generally cylindrical inner housing wall 30 and the generally cylindrical outer housing wall 62 are spaced radially from one another by a uniform annular gap G. An annular band 90 (FIG. 7) is disposed in the annular gap G. The annular band 90 is shown as being circumferentially discontinuous, by way of example and without limitation, with a slit 92 extending across the band 90, though it is to be recognized that the annular band 90 could be circumferentially continuous, depending on how it is assembled and held in place. The slit 92 allows the band 90 to be circumferentially constricted and radially expanded, the facilitating assembly. The annular band 90 is fixed to one of the generally cylindrical inner housing wall 30 and the generally cylindrical outer housing wall 62 and free relative to the other generally cylindrical inner housing wall 30 and the generally cylindrical outer housing wall 62. The band 90 can be fixed to the desired inner housing wall 30 or outer housing wall 62 via at least one of a press fit, a weld joint, an adhesive, or otherwise. If press fit into the outer housing cavity 64, the slit 92 can allow the wall to be constricted sufficiently without bucking, with the annular wall of the band 90 exerting sufficient spring force to cause the band 90 to remain fixed to the outer housing wall 62. To further facilitate retention of the band 90 to the respective inner or outer housing wall 30, 62, the respective inner or outer housing wall 30, 62 could be provided with a curled lip (inwardly for the outer housing wall 62 and outwardly for the inner housing wall) to retain the band 90 against moving axially outwardly from its intended fixed position between the inner and outer housing walls 30, 62. The annular band 90 can be formed of any desired material, including metal or plastic, with the selected material providing a reduced friction surface to facilitate the aforementioned relative torsional (rotational) and axial movement between the inner and outer housing walls 30, 62. The annular band 90 can be provided to occupy the full gap G (slight interference to a line-to-line fit), or substantially the full gap G (substantially meaning that a slight gap of between about 0.0001-0.005 inches could remain). With the gap G being substantially reduced or eliminated, the bending stiffness between the inner housing 28 and the outer housing 60, and thus, between the respective first and second shafts 40, 72, is increased. The bending stiffness is further increased as a result of the resistance to bending, i.e. the interface between inner and outer housing walls 30, 62, being spaced radially outwardly from the axis A along which a bending force would be generated. Accordingly, it will be recognized by one possessing ordinary skill in the art that the inner housing subassembly 24 and the outer housing subassembly 26 are able to rotate and translate relative to their common axis A along which first and second shafts 14, 16, 40, 72 extend via flexing of resilient flex coupling 42, as discussed above, while the inner housing wall 30 of inner housing 28 and the outer housing wall 62 of outer housing 60 restrict bending between the inner housing subassembly 24 and the outer housing subassembly, thereby restricting bending between the first and second shafts 14, 16, 40, 72.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Individual elements or features of a particular embodiment are generally not limited to that particular embodiment, but, where applicable, are interchangeable and can be used in a selected embodiment, even if not specifically shown or described. Accordingly, the invention is not to be seen as limited by the foregoing description.

Having thus described the invention, it is claimed:

1. A flex coupling assembly, comprising:
an inner housing having a generally cylindrical inner housing wall extending along an axis and bounding an inner housing cavity between an inner housing first end and an inner housing second end, said inner housing first end having an inner housing end face extending generally transversely to said axis and said inner housing second end being open;
a first shaft fixed to said inner housing end face and extending along said axis;
an outer housing having a generally cylindrical outer housing wall extending along said axis and bounding an outer housing cavity between an outer housing first end and an outer housing second end, said outer housing first end having an outer housing end face extending generally transversely to said axis and said outer housing second end being open;
a second shaft fixed to said outer housing end face and extending along said axis;
a resilient flex coupling fixed to said inner housing in said inner housing cavity; and
a retention member fixed to said outer housing by at least one retention fastener member and retaining said inner housing in said outer housing cavity,
wherein said inner housing and said outer housing are moveable relative to one another axially along said axis and rotatably about said axis via flexing of said resilient flex coupling.

2. The flex coupling assembly of claim 1, wherein said inner housing end face has at least one through opening, said at least one retention fastener member extending through said at least one through opening in clearance relation therewith, wherein said at least one through opening acts as a positive stop to limit the degree of relative rotation between said inner housing and said outer housing.

3. The flex coupling assembly of claim 2, wherein said retention member has at least one protrusion extending through said at least one through opening in clearance relation therewith into engagement with said resilient flex coupling, said at least one retention fastener member extending through said at least one protrusion.

4. The flex coupling assembly of claim 3, wherein said at least one retention fastener member includes a plurality of retention fastener members, said at least one through opening includes a plurality of through openings, and said at least one protrusion includes a plurality of protrusions, said plurality of retention fastener members extending through said plurality of protrusions and said plurality of protrusions extending through said plurality of through openings in clearance relation therewith.

5. The flex coupling assembly of claim 1, wherein said resilient flex coupling is fixed to said inner housing by at least one coupling fastener member and wherein said retention member has at least one slot, said at least one coupling fastener member extending into said at least one slot in clearance relation therewith.

6. The flex coupling assembly of claim 5, wherein said inner housing end face has at least one through opening, said at least one retention fastener member extending through said at least one through opening in clearance relation therewith, wherein at least one of said at least one slot and said at least one through opening acts as a positive stop to limit the degree of relative rotation between said inner housing and said outer housing.

7. The flex coupling assembly of claim 6, wherein said retention member has at least one protrusion extending through said at least one through opening in clearance relation therewith into engagement with said resilient flex coupling, said at least one retention fastener member extending through said at least one protrusion.

8. The flex coupling assembly of claim 7, wherein said at least one through opening acts as a positive stop against said at least one protrusion to limit the degree of relative rotation between said inner housing and said outer housing.

9. The flex coupling assembly of claim 1, wherein said generally cylindrical inner housing wall and said generally cylindrical outer housing wall are spaced radially from one another by an annular gap and further including an annular band disposed in said annular gap.

10. The flex coupling assembly of claim 9, wherein said annular band is circumferentially discontinuous.

11. The flex coupling assembly of claim 9, wherein said annular band is fixed to one of said generally cylindrical inner housing wall and said generally cylindrical outer housing wall.

12. The flex coupling assembly of claim 1, wherein said resilient flex coupling has a metal core overmolded with an elastomeric body.

13. A flex coupling assembly, comprising:
an inner housing subassembly including,
an inner housing having a generally cylindrical inner housing wall extending along an axis and bounding an inner housing cavity between an inner housing first end and an inner housing second end, said inner housing first end having an inner housing end face extending generally transversely to said axis and having at least one through opening and said inner housing second end being open,
a first shaft fixed to said inner housing end face and extending along said axis, and
a resilient flex coupling fixed to said inner housing in said inner housing cavity;
an outer housing subassembly including,
an outer housing having a generally cylindrical outer housing wall extending along said axis and bounding an outer housing cavity between an outer housing first end and an outer housing second end, said outer housing first end having an outer housing end face extending generally transversely to said axis and said outer housing second end being open, and
a second shaft fixed to said outer housing end face and extending along said axis;
said inner housing subassembly being disposed in said outer housing cavity; and
a retention member fixed to said outer housing by at least one retention fastener member, said at least one retention fastener member extending through said at least one through opening in said inner housing end face in clearance relation therewith and retaining said inner housing subassembly in said outer housing cavity,
wherein said inner housing and said outer housing are moveable relative to one another axially along said axis and rotatably about said axis via flexing of said resilient flex coupling.

14. The flex coupling assembly of claim 13, wherein said retention member has at least one protrusion extending through said at least one through opening in clearance relation therewith into engagement with said resilient flex coupling, said at least one retention fastener member extending through said at least one protrusion, wherein said at least one through opening acts as a positive stop to limit the degree of relative rotation between said inner housing and said outer housing.

15. The flex coupling assembly of claim 14, wherein said at least one retention fastener member includes a plurality of retention fastener members, said at least one through opening includes a plurality of through openings, and said at least one protrusion includes a plurality of protrusions, said plurality of retention fastener members extending through said plurality of protrusions and said plurality of protrusions extending through said plurality of through openings in clearance relation therewith into engagement with said resilient flex coupling.

16. The flex coupling assembly of claim 15, wherein said generally cylindrical inner housing wall and said generally cylindrical outer housing wall are spaced radially from one another by an annular gap and further including a generally cylindrical band disposed in said annular gap.

17. The flex coupling assembly of claim 16, wherein said generally cylindrical band is circumferentially discontinuous.

18. The flex coupling assembly of claim 16, wherein said generally cylindrical band is fixedly retained in said annular gap.

19. The flex coupling assembly of claim 16, wherein a bending force tending to bend said first shaft relative to said second shaft is counteracted by an equal and opposite force applied between said generally cylindrical inner housing wall and said generally cylindrical outer housing wall.

20. The flex coupling assembly of claim 14, wherein said resilient flex coupling is fixed to said inner housing by at least one coupling fastener member and wherein said retention member has at least one slot, said at least one coupling fastener member extending into said at least one slot in clearance relation therewith.

* * * * *